Oct. 15, 1929.  E. KUREK  1,731,309
METHOD OF RECOVERING IODINE
Filed Nov. 29, 1922
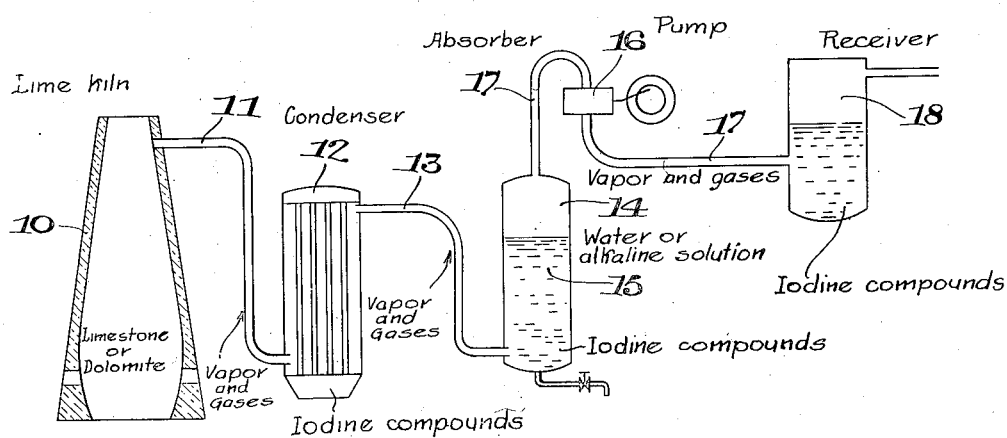

Patented Oct. 15, 1929

1,731,309

UNITED STATES PATENT OFFICE

EDMUND KUREK, OF CHIPPEWA FALLS, WISCONSIN

METHOD OF RECOVERING IODINE

Application filed November 29, 1922. Serial No. 603,999.

This invention has for its object to extract iodine products from limestone and dolomite by a distillation process.

Referring to the accompanying drawing, the figure represents a diagram of the apparatus used in the process under this invention.

In this drawing, 10 indicates a lime kiln in which limestone or dolomite is burned, the vapors and gases laden with iodine products being sucked therefrom through a pipe 11 into a condenser 12 cooled by water or air. Here the iodine compounds are deposited as the result of the condensation and are collected. Certain vapors not condensed are drawn from the condenser 12 through a pipe 13 to an absorber 14, where they are caused to rise through a body of water or an alkaline solution 15, where a further separation of the iodine compounds is obtained. The part 16 represents the pump for sucking the gas and vapors through this train of connections and the remaining gases after passing through the body of liquid in the absorber 14 are conducted by the pump through a pipe 17 to a receiver 18, where they again pass through water to complete the condensation.

It will be understood that the liquids condensed in the condenser 12 and absorbed in the absorber 14 and the receiver 18 contain the valuable iodine compounds which it is sought to recover.

What I claim as new and desire to secure by Letters Patent is:

The process of producing iodine compounds which consists in burning limestone in a kiln, extracting the kiln gases therefrom and condensing the iodine compounds from said kiln gases.

In testimony whereof I affix my signature.

EDMUND KUREK.